(12) United States Patent
Smith et al.

(10) Patent No.: US 6,845,831 B2
(45) Date of Patent: Jan. 25, 2005

(54) PTO SHAFT BRAKE

(75) Inventors: Ellis Junior Smith, Martinez, GA (US); Hariharan Viswanathan, Augusta, GA (US)

(73) Assignee: Deere & Company, Moline, IL (US)

( * ) Notice: Subject to any disclaimer, the term of this patent is extended or adjusted under 35 U.S.C. 154(b) by 138 days.

(21) Appl. No.: 10/313,139

(22) Filed: Dec. 5, 2002

(65) Prior Publication Data

US 2004/0108173 A1 Jun. 10, 2004

(51) Int. Cl.$^7$ ................................................. B60K 25/00
(52) U.S. Cl. ..................................... 180/53.1; 188/186
(58) Field of Search .............................. 180/53.1, 53.4, 180/53.5, 53.7, 53.8; 188/184, 185, 186

(56) References Cited

U.S. PATENT DOCUMENTS

| | | | | |
|---|---|---|---|---|
| 2,295,503 A | * | 9/1942 | Miller | 188/186 |
| 4,120,385 A | * | 10/1978 | Roider | 188/181 R |
| 5,002,162 A | * | 3/1991 | Nemoto | 188/75 |
| 5,913,950 A | * | 6/1999 | Matsufuji | 74/730.1 |
| 5,937,697 A | * | 8/1999 | Matsufuji | 74/11 |

* cited by examiner

Primary Examiner—David R. Dunn

(57) ABSTRACT

A spring loaded snubber brake is provided for a Power Take Off (PTO) shaft of a tractor. The brake is carried by the PTO shaft and utilizes the centrifugal force created by the spinning shaft to become disengaged as the shaft rotates and become engaged as the shaft is declutched. Since the brake does not apply any frictional force on the shaft as it rotates, there is no parasitic loss of PTO output horsepower. As the shaft is declutched and comes to rest, the brake springs urge it into engagement with the shaft to prevent inadvertent rotation of the shaft due to residual forces produced by hydraulic fluid forces operating on the PTO drive components.

8 Claims, 1 Drawing Sheet

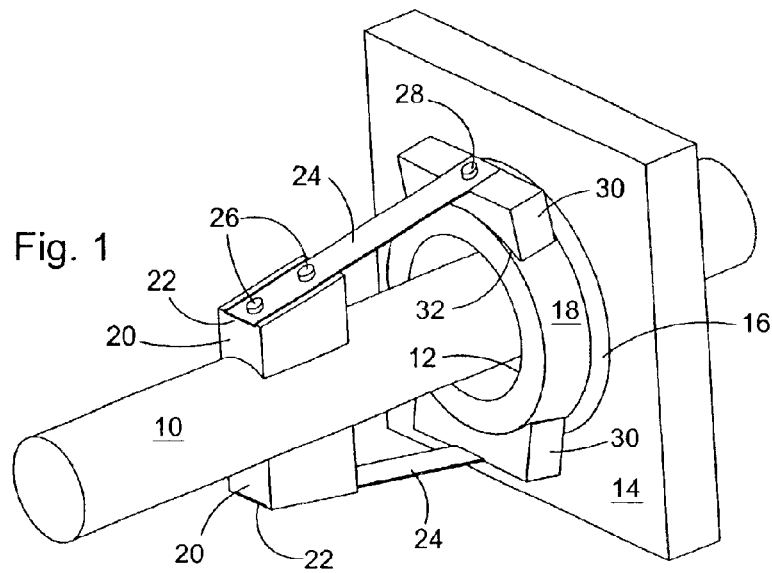
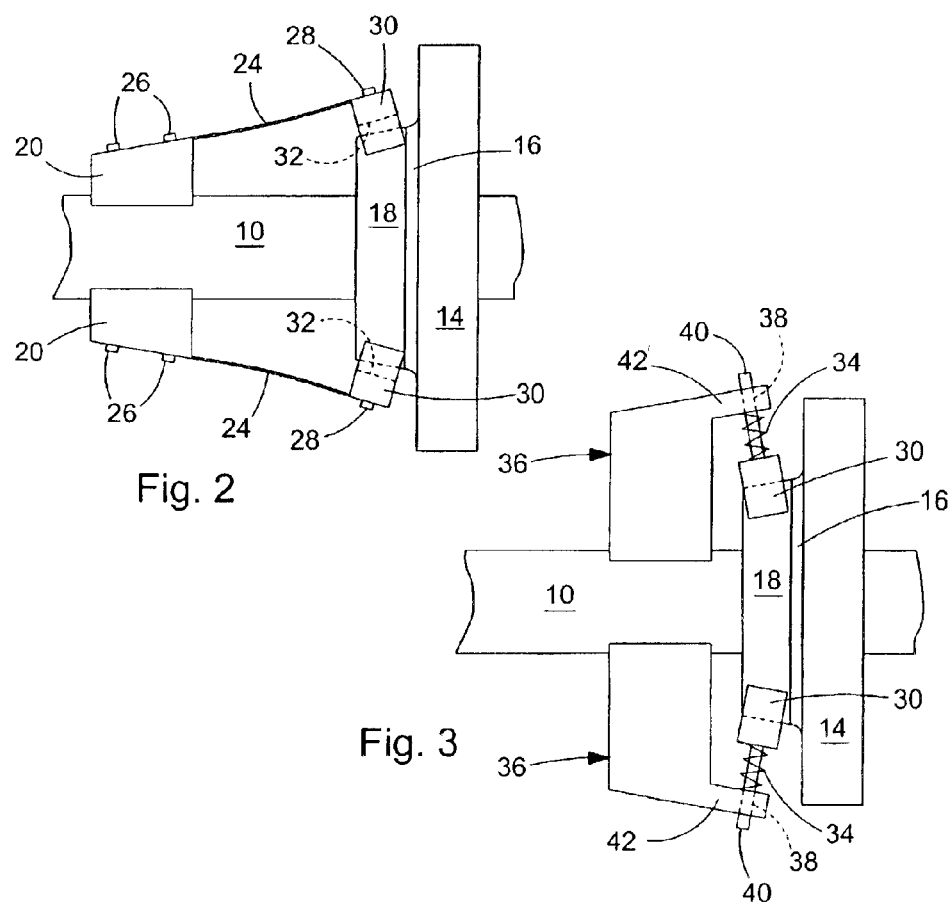

PTO SHAFT BRAKE

FIELD OF THE INVENTION

The present invention relates to the Power Take Off (PTO) shaft of working vehicles such as lawn and garden tractors, and more specifically to a brake for the PTO shaft.

BACKGROUND OF THE INVENTION

Vehicles such as agricultural and/or lawn and garden tractors are commonly provided with a power takeoff shaft that is used to drive attachments such as snow blowers, power brooms and drawn implements which require a powered drive input.

Typically the PTO shafts are provided with a clutch that is operated by the hydraulic system of the tractor. When the PTO shaft is not being used to drive an attachment or implement, the clutch is disengaged and the shaft is not powered. When the clutch is disengaged, the vehicle hydraulic system continues to operate and hydraulic fluid flows through the system, producing small residual torques on the drive components for the PTO shaft. Consequently, even though the torques are small, the PTO shaft may continue to slowly turn when the clutch has been disengaged. When an operator wants to connect an attachment or implement to the PTO shaft, such inadvertent rotation of the PTO shaft could prove troublesome.

Accordingly, spring steel snubber brakes have been provided to prevent inadvertent rotation of the PTO shaft when the clutch is disengaged. Present snubber brakes utilize a pair of U-shaped flat springs that are clamped around approximately three-fourths of the PTO shaft. These flat springs are in constant sliding contact with the shaft to retard its rotation, particularly when the power to the PTO shaft has been stopped. While these snubber springs serve to prevent inadvertent rotation of the PTO shaft when it is declutched, they create a friction on the shaft since they bear on the PTO shaft at all times, even when it is operating at normal speeds to drive attachments and/or implements. Accordingly, they cause a parasitic friction loss that robs the PTO system of horsepower, particularly at higher speeds.

Therefore, it would be desirable to provide a PTO shaft brake which functions to prevent inadvertent rotation of the shaft when the PTO clutch has been disengaged, as well as one which does not reduce the horsepower of the PTO system when it is rotating at operating speeds.

SUMMARY OF THE INVENTION

Towards these ends, there is provided a PTO shaft snubber brake which utilizes the centrifugal force of the rotating shaft to become disengaged when the shaft operates and to become engaged when the shaft has been declutched.

The brake is comprised of a pair of collar members rigidly coupled to the shaft for rotation therewith. The collar members each support a spring element which is coupled with a respective brake shoe. The brake shoe is adapted to engage a wear surface that is provided on the differential case housing which supports the PTO shaft.

Accordingly, as the shaft rotates, the centrifugal force generated by the rotation of the shaft urges the brake shoe outwardly away from the shaft so that the shoes disengage from the wear surface of the housing. Conversely, as the PTO shaft is disengaged, the spring elements urge the brake shoes into engagement with the wear surfaces on the housing to stop the rotation of the PTO shaft.

Since the snubber brake utilizes the rotation of the shaft to disengage the shoes when the shaft is rotatingly engaged, no parasitic friction loss or horsepower drop is experienced during PTO shaft operation. Similarly, since the brake springs force the brake shoes into engagement when the PTO shaft is no longer being driven, the shaft experiences no incidental rotation and the operator can thereby more easily couple attachments and/or implements to it.

BRIEF DESCRIPTION OF THE DRAWINGS

FIG. 1 is a schematic perspective view illustrating a PTO shaft and brake of the present invention.

FIG. 2 is a side view of the structure shown in FIG. 1 with the brake shoes radially extended from the PTO shaft so that they are disengaged from the wear surface of the differential housing.

FIG. 3 is an alternate embodiment which utilizes compression springs in place of the flexible steel spring elements shown in FIGS. 1 and 2.

DESCRIPTION OF THE PREFERRED EMBODIMENT

Looking first to FIG. 1, there is illustrated a schematic perspective view of a power take off shaft 10 carried within an opening 12 of a differential housing 14. The shaft 10 and housing 14 are illustrated only partially in the drawings. The opening 12 of the housing 14 typically contains a bearing, which is not illustrated, to permit the shaft 10 to rotate. The housing 14 includes an outwardly extending neck or shoulder 16 with a first wear surface 18 machined thereon. The wear surface 18 may also be provided through attaching replaceable wear elements to the neck 16.

The PTO shaft 10 carries a pair of collar members 20 which are circumferentially spaced around the shaft 10 approximately 180 degrees. The collar members 20 each include a slot 22 wherein there is received an elongated flexible steel spring element 24, which in the preferred embodiment is secured to the collar member 20 with screws or similar types of fasteners 26. The flexible spring elements 24 are attached by similar screws or fasteners 28 at their other ends to brake shoes 30. Each shoe 30 includes a second wear surface or element 32 positioned to engage the first wear surface 18 on the housing 14.

FIG. 1 illustrates the positions of the brake shoes 30 when the PTO shaft 10 has been disengaged and is at rest. In this condition, the shoes 30 are urged by the flexible spring elements 24 toward engagement with the wear surface 18 on the differential case housing 14.

Looking now to FIG. 2, there is illustrated the position of the springs 24 and shoes 30 when the shaft 10 is being rotated and centrifugal force has urged the shoes 30 outwardly away from the wear surface 18 on the housing 14. In this view, it can be seen that the flexible spring elements 24 are bent slightly outwardly away from the shaft 10 and the second wear surfaces 32 on the shoes 30 have disengaged the first wear surfaces 18 on the housing 14.

While the preferred embodiment utilizes flexible steel spring elements 24 to urge the brake shoes 30 toward engagement with the wear surface 18 of the housing 14, the second embodiment illustrated in FIG. 3 utilizes compression springs 34 between the collar member 36 and the brake shoes 30. In this embodiment, the collar members 36 are generally L-shaped, having an opening 38 in one end of which is spaced apart from the shaft 10. The opening 38 receives a rod 40 which is coupled with or connected to the brake shoe 30. The compression spring 34 is then placed around the rod 40, between the leg 42 and the shoe 30 to urge the shoe 30 towards engagement with the first wear surface 18.

In operation, both the preferred and second embodiments operate in essentially the same manner. As the PTO shaft 10 is rotated, centrifugal force will urge the brake shoes 30 away from the center of the shaft 10. As they move outwardly, the second wear surface 32 on the brake shoes 30 disengages the first wear surface 18 on the differential case housing 14. As the PTO shaft 10 comes to rest, the spring elements 24 or 34 urge the brake shoes 30 towards the center of the PTO shaft 10 and the second wear surface 32 engages the first wear surface 18.

With the present invention, there is provided a PTO shaft brake which serves to become disengaged as the shaft rotates, thereby not transferring any retarding force to the PTO shaft to reduce its horsepower output. Conversely, when the clutch has been disengaged and the shaft comes to rest, the brake shoes engage the wear surfaces on the housing to resist any residual torque produced by the fluid forces on the PTO components that would urge the shaft to rotate.

With the present invention, there is provided a simple, effective and inexpensive PTO shaft snubber that not only eliminates the parasitic friction on the shaft which could rob it of horsepower at higher speeds, but also prevents rotation of the shaft when the clutch has been disengaged.

Having described the preferred embodiment, it will become apparent that various modifications can be made without departing from the scope of the invention as defined in the accompanying claims.

What is claimed is:

1. In a vehicle having a frame, an engine carried by the frame, a housing carried by the frame, said housing having an opening and supporting a first wear surface, an elongated PTO shaft drivingly coupled with the engine for rotation within the opening, and a PTO shaft brake including two collar members carried by the shaft, said members being spaced circumferentially apart on the shaft by approximately 180 degrees;

two brake shoes, each a brake shoe having a second wear surface;

at least one spring element coupled with each collar member, said spring element extending between the collar member and the brake shoe, said spring element urging the second wear surface of the brake shoe towards the first wear surface supported by the housing.

2. The invention described in claim 1 wherein the spring element is a flexible spring.

3. The invention described in claim 1 wherein the spring element is a compression spring.

4. The invention described in claim 1 wherein there are two brake shoes and two spring elements and each collar member is coupled with a spring element that is respectively coupled with a brake shoe.

5. In a vehicle having a frame, an engine carried by the frame, a housing carried by the frame, said housing having an opening and also supporting a first wear surface, an elongated PTO shaft drivingly coupled with the engine for rotation within the opening, and a PTO shaft brake including two collar members carried by the shaft, said members being spaced circumferentially apart on the shaft by approximately 180 degrees;

at least one spring element carried by each collar member, said spring element extending generally parallel to the shaft; and a brake shoe coupled with the spring element, said brake shoe having a second wear surface that is engageable with the first wear surface supported by the housing.

6. The invention described in claim 5 wherein the spring element is a flexible steel spring.

7. The invention described in claim 5 wherein there are two brake shoes and two spring elements and each collar member is coupled with a spring element that is respectively coupled with a brake shoe.

8. In a vehicle having a frame, an engine carried by the frame, a housing carried by the frame, said housing supporting a bearing with an opening therethrough and a wear surface, an elongated PTO shaft drivingly coupled with the engine for rotation within the opening of the bearing, and a PTO shaft brake including two collar members circumferentially spaced apart on and carried by the shaft;

at least one spring steel element carried by each collar member, said steel elements extending generally parallel to the shaft, and a brake shoe coupled with each spring steel element, said shoes each having a wear surface that is engageable with the wear surface supported by the housing.

* * * * *